(12) United States Patent
Honda et al.

(10) Patent No.: US 11,973,533 B2
(45) Date of Patent: Apr. 30, 2024

(54) TRANSMISSION DEVICE INTERCONNECTION REGISTRATION DEVICE, TRANSMISSION DEVICE INTERCONNECTION REGISTRATION METHOD, AND PROGRAM

(71) Applicant: Nippon Telegraph and Telephone Corporation, Tokyo (JP)

(72) Inventors: Kentaro Honda, Musashino (JP); Ken Ito, Musashino (JP); Hideki Maeda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/800,933

(22) PCT Filed: Feb. 25, 2020

(86) PCT No.: PCT/JP2020/007436
§ 371 (c)(1),
(2) Date: Aug. 19, 2022

(87) PCT Pub. No.: WO2021/171354
PCT Pub. Date: Sep. 2, 2021

(65) Prior Publication Data
US 2023/0082032 A1    Mar. 16, 2023

(51) Int. Cl.
*H04J 14/02* (2006.01)
*H04B 10/079* (2013.01)

(52) U.S. Cl.
CPC ........ *H04B 10/079* (2013.01); *H04J 14/0212* (2013.01)

(58) Field of Classification Search
None
See application file for complete search history.

(56) References Cited

U.S. PATENT DOCUMENTS 6,256,443 B1   7/2001   Uruno et al.
8,327,004 B2 *   12/2012   Baldwin ............... G06F 3/0605
                                                                              709/227

(Continued)

FOREIGN PATENT DOCUMENTS

JP    2007328344    12/2007
JP    2019176393    10/2019

OTHER PUBLICATIONS

Medhi, Von Neumann Architecture, 2012 (Year: 2012).*

(Continued)

*Primary Examiner* — Jai M Lee
(74) *Attorney, Agent, or Firm* — Fish & Richardson P.C.

(57) ABSTRACT

An inter-transmission device connection registration device 30A includes a storage unit 31 that registers connection information of a case where transponders 12a to 13n and photo couplers 14a to 14n as divided various transmission devices are connected through a port o and a port i, a light emission instruction unit 33 that provides a light emission instruction to the subordinately connected transponders, a transmission/reception detection unit 34 configured to detect a light transmission and a light reception at opposing ports o and i1 between transmission devices, e.g., the transponder 12a and the photo coupler 14 in accordance with the light emission instruction, and a registration control unit 35 that performs a control of registering, in the storage unit 31, connection information W2a of the port o on a light transmission side and the port i1 on a light reception side that are detected.

8 Claims, 11 Drawing Sheets

(56) References Cited

U.S. PATENT DOCUMENTS

| | | | | |
|---|---|---|---|---|
| 8,543,957 B2* | 9/2013 | Takita | ................ | H04J 14/0257 398/43 |
| 8,705,959 B2* | 4/2014 | Takita | ................ | H04J 14/0284 398/58 |
| 8,811,817 B2* | 8/2014 | Sakauchi | ................ | H04J 14/02 398/56 |
| 9,525,505 B2* | 12/2016 | Han | .................... | H04J 14/0212 |
| 9,680,569 B2* | 6/2017 | Archambault | ... | H04B 10/07955 |
| 11,522,614 B2* | 12/2022 | Okada | ................ | H04J 14/0212 |
| 2005/0246491 A1* | 11/2005 | Yamamoto | ............ | G06F 3/0607 711/170 |
| 2017/0250752 A1* | 8/2017 | Yuki | ................ | H04Q 11/0062 |
| 2021/0014585 A1* | 1/2021 | Uematsu | ............ | H04Q 11/0478 |

OTHER PUBLICATIONS

Ishii et al., "Cyber Photonic Platform: Automatizing the Physical Layer for Total Network Automation," 2019 Electronic Information and Communication Society Conference Communication Lecture Proceedings 2, Sep. 10, 2019, pp. SS-146-SS-147, 5 pages (with English Translation).

* cited by examiner

Fig. 2

CONNECTION TABLE 40A

| TRANSPONDER | PHOTO COUPLER | CONNECTION INFORMATION D1 | PHOTO COUPLER | FIRST WSS | CONNECTION INFORMATION D2 | FIRST WSS | SECOND WSS | CONNECTION INFORMATION D3 |
|---|---|---|---|---|---|---|---|---|
| 12a-o | 14a-i1 | W2a | 14a-o3 | 15-i2 | W4a | 15-o1 | 16a-i2 | W5a |
| 12b-o | 14a-i2 | W2b | 14n-o3 | 15-i8 | W4n | 15-o5 | 16n-i3 | W5n |
| 12n-o | 14a-i10 | W2n | | | | | | |
| 13a-o | 14n-i1 | W3a | | | | | | |
| 13b-o | 14n-i2 | W3b | | | | | | |
| 13n-o | 14n-i10 | W3n | | | | | | |

Fig. 5

CONNECTION TABLE 40B

| TRANSPONDER | PHOTO COUPLER | CONNECTION INFORMATION D1 | PHOTO COUPLER | FIRST WSS | CONNECTION INFORMATION D2 | FIRST WSS | SECOND WSS | CONNECTION INFORMATION D3 |
|---|---|---|---|---|---|---|---|---|
| 12a-o | 14a-i1 | W2a | 14a-o3 | 15-i2 | W4a | 15-o1 | 16a-i2 | W5a |
| 12b-o | 14a-i2 | W2b | 14n-o3 | 15-i8 | W4n | 15-o5 | 16n-i3 | W5n |
| 12n-o | 14a-i10 | W2n | | | | | | |
| 13a-o | 14n-i1 | W3a | | | | | | |
| 13b-o | 14n-i2 | W3b | | | | | | |
| 13n-o | 14n-i10 | W3n | | | | | | |
| 13p-o | 14p-i3 | W3p | 14p-o2 | 15-i15 | W4p | 15-o16 | 16p-i3 | W5p |

Fig. 8

CONNECTION TABLE 40C

| TRANSPONDER | SECOND WSS | CONNECTION INFORMATION D1a |
|---|---|---|
| 12a-o | 16a-i1 | W2a |
| 12b-o | 16a-i2 | W2b |
| 12n-o | 16a-in | W2n |
| 13a-o | 16n-i1 | W3a |
| 13b-o | 16n-i2 | W3b |
| 13n-o | 16n-in | W3n |

TRANSMISSION DEVICE INTERCONNECTION REGISTRATION DEVICE, TRANSMISSION DEVICE INTERCONNECTION REGISTRATION METHOD, AND PROGRAM

CROSS-REFERENCE TO RELATED APPLICATIONS

This application is a National Stage application under 35 U.S.C. § 371 of International Application No. PCT/JP2020/007436, having an International Filing Date of Feb. 25, 2020. The disclosure of the prior application is considered part of the disclosure of this application, and is incorporated by reference in its entirety into this application.

TECHNICAL FIELD

The present invention relates to an inter-transmission device connection registration device, an inter-transmission device connection registration method and a program that automatically store and register connection information in a storage unit when various optical signal transmission devices that are divided are connected using an optical fiber.

BACKGROUND ART

In the related art, in a transmission device 11 disposed in a station building 10, as various optical signal transmission devices, n transponders 12a, 12b, . . . , 12n and n transponders 13a, 13b, . . . , 13n, n, photo couplers 14a to 14n, a first wavelength selective switch (WSS) 15 and n second WSSs 16a to 16n as various WSSs are incorporated in advance by optical wiring (also referred to simply as wiring) with an optical fiber or the like, as illustrated in FIG. 10. Note that a set of optical amplifiers 17a to 17n is connected to the second WSSs 16a to 16n. The transmission device 11 with such an internal wiring does not require wiring.

In recent years, however, as illustrated in the transmission system 1 of FIG. 11, in the station building 10, as various transmission devices, n transponders 12a to 12n and n transponders 13a to 13n, n photo couplers 14a to 14n, the first WSS 15, then second WSSs 16a to 16n are provided in blocks of functional units as illustrated by broken line frames, and are disposed at different positions. After this installation, the transmission devices are connected in a unit of the functional block by using an optical fiber by a person with reference to a wiring diagram.

Further, the connection information between various transmission devices that are connected are stored and registered by a person in a storage unit (not illustrated in the drawings) of an operation system (OpS) 20. The OpS 20 is composed of a collection of software for individual and integrated control of various transmission devices.

In recent years, as illustrated in FIG. 11, due to disaggregation by which various transmission devices are divided, the number of locations where optical wiring is performed in the same station building 10 has been increased to 100 or more locations. Along with this increase, the registration of each connection information after wiring has been increasing.

As described in PTL 1, there is a technology of this kind that maps a unique ID (Identifier) to each of the various transmission devices, and furthermore maintains the unique ID according to the wiring.

CITATION LIST

Patent Literature

PTL 1 JP 2019-176393A

SUMMARY OF THE INVENTION

Technical Problem

However, the technology of PTL 1 above requires a control device that maintains a unique ID for each of all transmission devices, then identifies the unique ID of the opposing device for each connection between transmission devices, and causes transmission to be performed between all transmission devices according to this identified ID. This increases the cost of the device.

In the connection method between transmission devices with reference to FIG. 11, it is necessary for a person to register a large number of connection information in the storage unit using the control software of the OpS 20 or other software while keeping track of the connection information. This requires a lot of labor and time for registration, and also results in a large amount of rework when incorrect registration occurs.

In consideration of this situation, an object of the present invention is to make it easy to register connection information between various transmission devices.

Means for Solving the Problem

To solve the above-mentioned problems, an inter-transmission device connection registration device includes a storage unit configured to store and register connection information of a case where divided various transmission devices are connected through opposing ports, a light emission instruction unit configured to provide a light emission instruction to a light emitting transmission device disposed on one end side in subordinately connected transmission devices, a transmission/reception detection unit configured to detect a light transmission and a light reception at the opposing ports between the transmission devices in accordance with the light emission instruction, and a registration control unit configured to perform a control of registering connection information about a port on a light transmission side and a port on a light reception side that are detected, in the storage unit.

Effects of the Invention

The present invention makes it easy to register connection information between various transmission devices.

BRIEF DESCRIPTION OF DRAWINGS

FIG. 2 is a diagram illustrating storage information of a connection table of the first embodiment.

FIG. 5 is a diagram illustrating storage information of a connection table of the second embodiment.

FIG. 8 is a diagram illustrating storage information of a connection table of the third embodiment.

DESCRIPTION OF EMBODIMENTS

Figure 1:
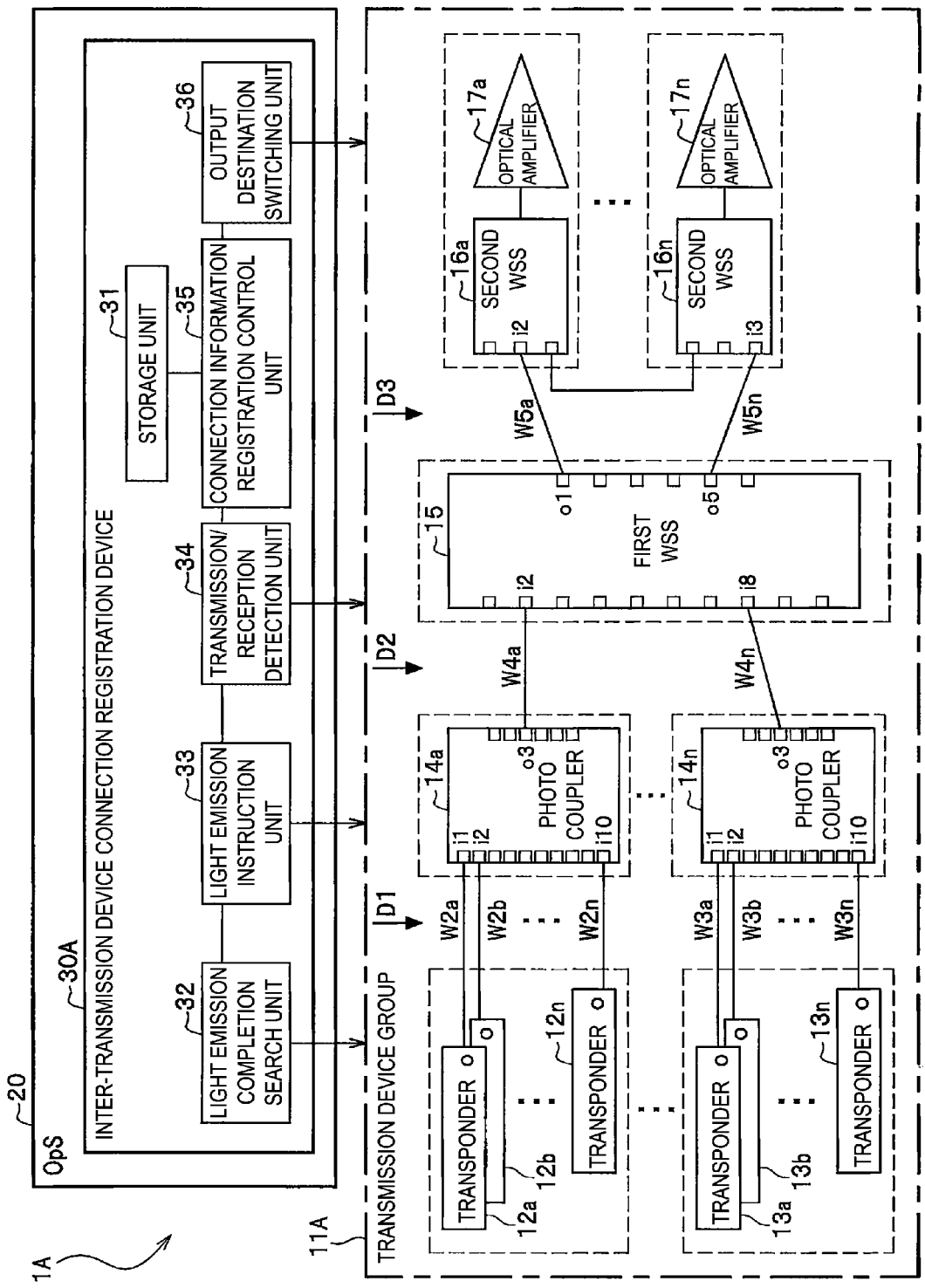
FIG. 1 is a block diagram illustrating a configuration of a transmission system using an inter-transmission device connection registration device according to a first embodiment of the present invention.

Embodiments of the present invention are described below with reference to the accompanying drawings. It should be noted that in all diagrams in this specification, the components with the same function are denoted with the same reference numerals, and description thereof will be appropriately omitted.

Configuration of First Embodiment

FIG. 1 is a block diagram illustrating a configuration of a transmission system using an inter-transmission device connection registration device according to a first embodiment of the present invention.

Figure 11:
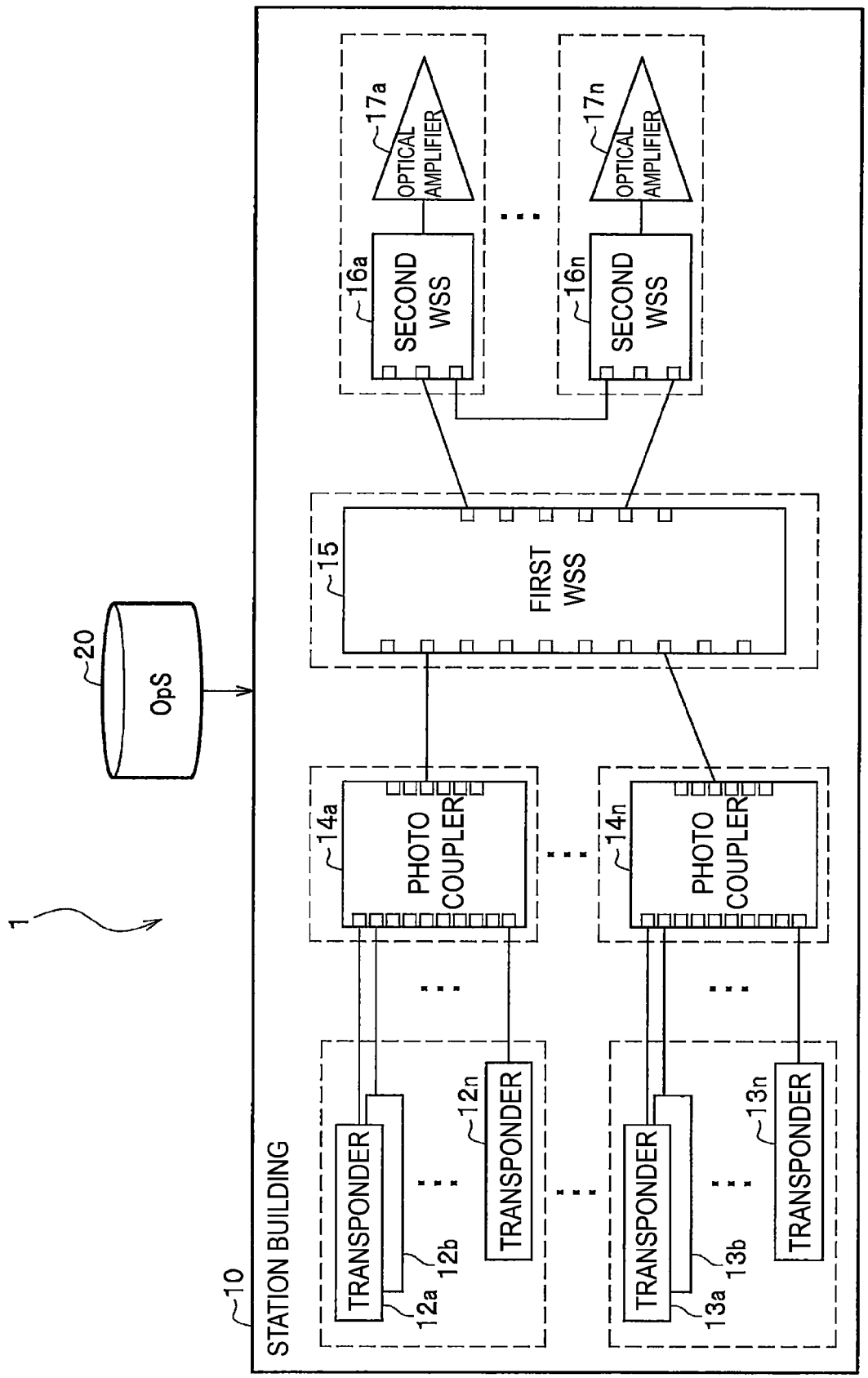
FIG. 11 is a block diagram illustrating a known state where divided various transmission devices are wired and connected.

A transmission system 1A of the first embodiment illustrated in FIG. 1 is different from a known transmission system 1 (FIG. 11) in that an OpS 20 is provided with an inter-transmission device connection registration device (registration device) 30A. The registration device 30A makes it possible to automatically store and register the connection information in a storage unit 31 when various transmission devices disposed in a divided manner are connected using an optical fiber.

In this example, as the above-mentioned various transmission devices, n transponders 12a to 12n and n transponders 13a to 13n, n photo couplers 14a to 14n, a first WSS 15, and n second WSSs 16a to 16n are subordinately connected, and constitute a transmission device group 11A in the same station building. Note that the transponders 12a to 12n and the transponders 13a to 13n are referred to also as transponders 12a to 13n. The transponders 12a to 13n constitute the light emitting transmission device of the claim.

The second WSSs 16a to 16n are WSSs in a reconfigurable optical add/drop multiplexer (ROADM) function in which optical amplifiers 17a to 17n are mounted, respectively. As is well known, the ROADM function enables the operation of flexible wiring connections of the transmission system 1A as an optical core network.

The transponders 12a to 13n relay optical signals of various wavelengths in optical transmission paths. In addition, the transponders 12a to 13n emit light at a wavelength λ set in advance in response to a light emission instruction from the outside, and outputs an optical signal of the wavelength λ. The photo couplers 14a to 14n multiplex optical signals of multiple wavelengths and output the multiplexed optical signal to the first WSS 15. In addition, the photo couplers 14a to 14n separate the multiplexed optical signal from the first WSS 15 and output the separated optical signals to the transponders 12a to 13n.

The first WSS 15 selects input optical signals of different wavelengths, and outputs the selected optical signals to the predetermined second WSSs 16a to 16n. In addition, the first WSS 15 selects the optical signals of different wavelengths input from the second WSSs 16a to 16n, and outputs the selected optical signals to the predetermined photo couplers 14a to 14n. The second WSSs 16a to 16n output the input optical signal to an optical transmission path not illustrated in the drawings through the optical amplifiers 17a to 17n. It should be noted that although not illustrated in the drawing, n first WSSs 15 are provided as with the n photo couplers 14a to 14n. The same shall apply hereinafter.

In the transmission device group 11A described above, the transmission devices, namely the transponders 12a to 12n and the transponders 13a to 13n, the photo couplers 14a to 14n, the first WSS 15, and the second WSSs 16a to 16n, are divided in a functional block unit as surrounded by broken line frames. Ports (input/output terminals) of the transmission devices of each functional block is wired and connected using an optical fiber by a person.

This wiring connection is as follows. For example, a port o of the transponder 12a and a port i1 of the photo coupler 14a are connected to each other with the optical fiber (this optical connection is simply referred to as connection). This connection information D1 is referred to as W2a. Likewise, the port o of the transponder 12b and a port i2 of the photo coupler 14a are connected to each other, and this connection information D1 is referred to as W2b. Further, the port o of the transponder 12n and a port 4i10 of the photo coupler 14a are connected to each other, and this connection information D1 is referred to as W2n.

In addition, the port o of the transponder 13a and the port i1 of the photo coupler 14n are connected to each other, and this connection information D1 is referred to as W3a. The port o of the transponder 13b and the port i2 of the photo coupler 14n are connected to each other, and this connection information D1 is referred to as W3b. The port o of the transponder 13n and a port i10 of the photo coupler 14n are connected to each other, and this connection information D1 is referred to as W3n.

In addition, a port o3 of the photo coupler 14a and the port i2 of the first WSS 15 are connected to each other. This connection information D2 is referred to as W4a. The port o3 of the photo coupler 14n and the port i8 of the first WSS 15 are connected to each other, and this connection information D2 is referred to as W4n.

Further, a port o1 of the first WSS 15 and the port i2 of second WSS 16a are connected to each other, and this connection information D3 is referred to as W5a. A port o5 of the first WSS 15 and a port i3 of the second WSS 16n are connected to each other, and this connection information D3 is referred to as W5n.

As in this connection example, not all ports of the opposing ports i of the transponders 12a to 13n and the photo couplers 14a to 14n, the opposing ports of the photo couplers 14a to 14n and the first WSS 15, and the opposing ports of the first WSS 15 and the second WSSs 16a to 16n are connected. It should be noted that all ports may be connected.

Next, the inter-transmission device connection registration device 30A includes the storage unit 31, a light emission completion search unit 32, a light emission instruction unit 33, a transmission/reception detection unit 34, a connection information registration control unit 35, and an output destination switching unit 36. It should be noted that the light emission completion search unit 32, the light emission instruction unit 33 and the transmission/reception detection unit 34 are composed of a monitor function provided as standard in the OpS 20. The storage unit 31 is also composed of a storage medium such as a semiconductor memory and a hard disk provided as standard in the OpS 20. In addition, while the OpS 20 is composed of a collection of software for individual and integrated control of various types of transmission devices, the connection information registration control unit 35 and the output destination switching unit 36 are composed of software for the process thereof provided in the OpS 20.

At the start of inter-transmission device connection registration, the light emission instruction unit 33 provides a light emission instruction to the first transponder (e.g., the transponder 12a). In response to this instruction, the transponder 12a emits light at a wavelength set in advance, and outputs (referred to as light transmission) an optical signal of the light emission to the port i1 of the photo coupler 14a as the connection destination. In addition, when the above-mentioned light transmission and light reception are not detected at the transmission/reception detection unit 34, the light emission instruction unit 33 provides a light emission instruction to the next transponder (e.g., the transponder 12b).

The transmission/reception detection unit 34 detects the light transmission at output of an optical signal from each port of the transponders 12a to 13n, the photo couplers 14a to 14n and the first WSS 15, and detects the light reception of an optical signal at each port of the photo couplers 14a to 14n, the first WSS 15 and the second WSSs 16a to 16n.

When the light transmission and the light reception of the port are detected at the transmission/reception detection unit 34, the connection information registration control unit (also referred to as registration control unit) 35 refers to a connection table 40A (FIG. 2), and stores and registers connection information of the port of the light transmission and the port of the light reception in the storage unit 31. That is, the registration control unit 35 includes the connection table 40A illustrated in FIG. 2 in the storage unit.

The connection table 40A stores the port ID "12a-o" of the transponder 12a and the port ID "14a-i1" of the photo coupler 14a. Further, the connection table 40A stores the connection information D1 "W2a" of the opposing ports of the port IDs "12a-o and 14a-i1". They are stored such that a transponder ID and a photo coupler ID as opposing transmission devices and opposing port IDs of the transmission devices are stored in association with the connection information D1 "W2a". The same applies to all embodiments below.

Likewise, the connection table 40A stores the port ID "12b-o" of the transponder 12b and the port ID "14a-i2" of the photo coupler 14a. Further, the connection table 40A stores the connection information D1 "W2b" of the opposing ports of the port IDs "12b-o and 14a-i2". The connection table 40A stores the port ID "12b-o" of the transponder 12n and the port ID "14a-i2" of the photo coupler 14a. Further, the connection table 40A stores the connection information D1 "W2n" of the opposing ports of the port IDs "12n-o and 14a-i10".

In addition, the connection table 40A stores the port ID "13a-o" of the transponder 13a and the port ID "14n-i1" of the photo coupler 14n. Further, the connection table 40A stores the connection information D1 "W3a" of the opposing ports of the port IDs "13a-o and 14n-i1". The connection table 40A stores the port ID "13b-o" of the transponder 13b and the port ID "14n-i2" of the photo coupler 14n. Further, the connection table 40A stores the connection information D1 "W3b" of the opposing ports of the port IDs "13b-o and 14n-i2. The connection table 40A stores the port ID "13b-o" of the transponder 13n and the port ID "14n-i2" of the photo coupler 14n. Further, the connection table 40A stores the connection information D1 "W3n" of the opposing ports of the port IDs "13n-o and 14n-i10".

Further, the connection table 40A stores the port ID "14a-o3" of the photo coupler 14a and the port ID "15-i2" of the first WSS 15. Further, the connection table 40A stores the connection information D2 "W4a" of the opposing ports of the port IDs "14a-o3 and 15-i2". In addition, the connection table 40A stores the port ID "14n-o3" of the photo coupler 14n and the port ID "15-i8" of the first WSS 15. Further, the connection table 40A stores the connection information D2 "W4n" of the opposing ports of the port IDs "14n-o3 and 15-i8".

In addition, the connection table 40A stores the port ID "15-o1" of the first WSS 15 and the port ID "16a-i2" of the second WSS 16a. Further, the connection table 40A stores the connection information D3 "W5a" of the opposing ports of the port IDs "15-o1 and 16a-i2". In addition, the connection table 40A stores the port ID "15-o5" of the first WSS 15 and the port ID "16n-i3" of the second WSS 16a. Further, the connection table 40A stores the connection information D3 "W5n" of the port IDs "15-o5 and 16n-i3" at port connection.

When the light transmission of the port ID "14a-o3" of the photo coupler 14a and the light reception of the port ID "15-i2" of the first WSS 15 are detected at the transmission/reception detection unit 34, the registration control unit 35 stores the connection information W4a in the storage unit 31, for example.

When there is no light reception at each port of the second WSSs 16a to 16n after the registration of the connection information (e.g., the connection information W4a) of the port of the photo coupler (e.g., the photo coupler 14a) and the port of the first WSS 15 at the registration control unit 35, the output destination switching unit 36 performs a control of switching the output destination of the optical signal of the first WSS 15. Specifically, the output destination switching unit 36 performs a control of switching the output port of the first WSS 15 to the next port.

This switching control may be performed as described below by a switch function provided to the first WSS 15. Specifically, each time the output port is switched one by one, the first WSS 15 performs switching to the next output port with an internal switch function unless there is a light reception port at the second WSSs 16a to 16n of the ROADM function.

After the registration of the connection information D3 in the storage unit 31, the light emission completion search unit 32 searches whether all the transponders 12a to 13n have emitted light. This search is performed in the transponder order set in advance. When there is a transponder that has not emitted light, the light emission completion search unit 32 notifies the light emission instruction unit 33 of the transponder ID thereof. When the search determines that the light emission of all transponders 12a to 13n have been completed, the light emission completion search unit 32 notifies the light emission instruction unit 33 of the information representing that all of them have emitted light. The light emission instruction unit 33 that has received this notification stops the light emission instruction.

Operation of First Embodiment

Figure 3:
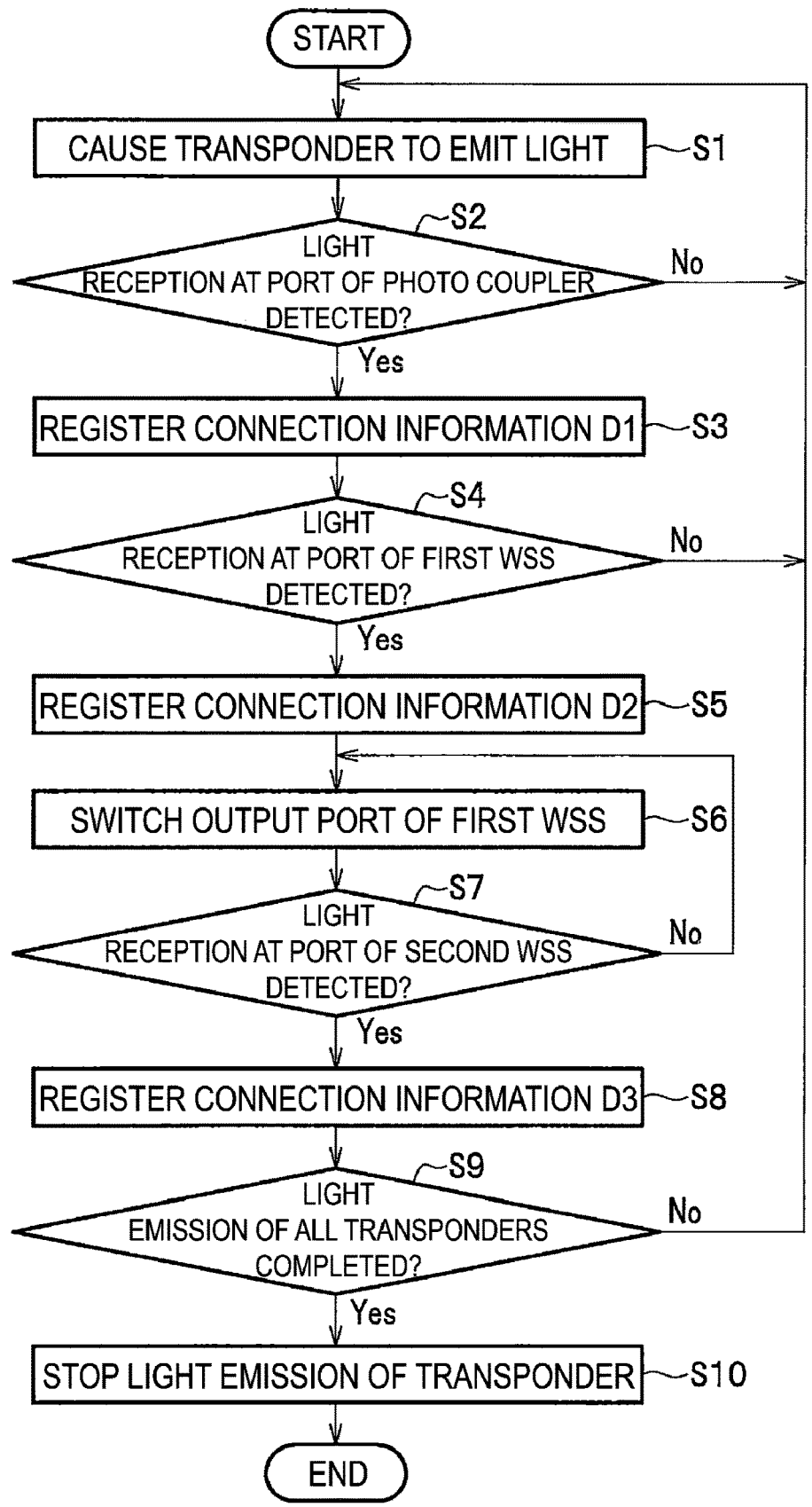
FIG. 3 is a flowchart for describing an operation of inter-transmission device connection registration by the inter-transmission device connection registration device of the first embodiment.

Next, an operation of inter-transmission device connection registration at the registration device 30A according to the first embodiment is described with reference to a flowchart illustrated in FIG. 3.

At step S1, at the start of inter-transmission device connection registration, the light emission instruction unit 33 provides a light emission instruction to the first transponder 12a in the order set in advance. In response to this instruction, the transponder 12a emits light at a predetermined wavelength (e.g., the wavelength λ1), and outputs (transmits) an optical signal of the wavelength λ1 from the port o to the port i1 of the photo coupler 14a as the connection destination.

At step S2, the transmission/reception detection unit 34 determines whether a light reception has been detected at the port i of the photo couplers 14a to 14n. When no light reception has been detected (No), the process is returned to the step S1, and the light emission instruction unit 33 provides a light emission instruction to the next transponder 12b.

On the other hand, suppose that it is determined at the step S2 that a light reception at the port i1 of the photo coupler 14a has been detected by the transmission/reception detection unit 34 (Yes). In this case, the transmission/reception detection unit 34 also detects a light transmission of the port o of the transponder 12a that has performed the output (transmission) of the optical signal to the light reception port i1 of the photo coupler 14a.

Next, at step S3, with the connection table 40A (FIG. 2), the registration control unit 35 cross-checks information "12a-o" about the port o of the transponder 12a where the light transmission has been detected by the transmission/reception detection unit 34, and information "14a-i1" about the port i1 of the photo coupler 14a where the light reception has been detected by the transmission/reception detection unit 34. The registration control unit 35 registers the connection information D1 "W2a" retrieved as a result of this in the storage unit 31.

Next, at step S4, whether a light reception has been detected at the port i of the first WSS 15 by the transmission/reception detection unit 34 is determined. When no light reception has been detected (No), the process is returned to the step S1, and the light emission instruction unit 33 provides a light emission instruction to the next transponder 12b.

On the other hand, suppose that it is determined at the step S4 that a light reception at the port i2 of the first WSS 15 has been detected by the transmission/reception detection unit 34 (Yes). In this case, the transmission/reception detection unit 34 simultaneously detects a light transmission of the port o3 of the photo coupler 14a that has performed the output of the optical signal to the light reception port i2 of the first WSS 15.

Next, at step S5, with the connection table 40A, the registration control unit 35 cross-checks information "14a-o3" about the port o3 of the photo coupler 14a where the light transmission has been detected by the transmission/reception detection unit 34, and information "15-i2" about the port i2 of the first WSS 15 where the light reception has been detected by the transmission/reception detection unit 34. The registration control unit 35 registers the connection information D2 "W4a" retrieved as a result of this in the storage unit 31.

Next, at step S6, the output destination switching unit 36 switches the output port o of the first WSS 15. It should be noted that in the initial state, the first output port o1 in the order set in advance is selected. The switching is performed one by one at each output port o of the first WSS 15.

Next, at step S7, whether a light reception has been detected at the ports i of the second WSSs 16a to 16n by the transmission/reception detection unit 34 is determined. When no light reception has been detected (No), the process is returned to the step S6, and the output destination switching unit 36 switches the output port o of the first WSS 15.

On the other hand, suppose that it is determined at the step S7 that a light reception at the port i2 of the second WSS 16a has been detected by the transmission/reception detection unit 34 (Yes). In this case, the transmission/reception detection unit 34 simultaneously detects a light transmission of the port o1 of the first WSS 15 that has performed the output of the optical signal to the light reception port i2 of the second WSS 16a.

Next, at step S8, with the connection table 40A, the registration control unit 35 cross-checks information "15-o1" about the port o1 of the first WSS 15 where the light transmission has been detected by the transmission/reception detection unit 34, and information "16a-i2" about the port i2 of the second WSS 16a where the light reception has been detected by the transmission/reception detection unit 34. The registration control unit 35 registers the connection information D3 "W5a" retrieved as a result of this in the storage unit 31.

Next, at step S9, the light emission completion search unit 32 searches whether all of the transponders 12a to 13n have emitted light. When not all of them have emitted light (No), the process is returned to step S1. In this case, the light emission completion search unit 32 notifies the light emission instruction unit 33 of an un-emitted transponder ID that is searched for in the transponder order set in advance. At step S1, the light emission instruction unit 33 provides a light emission instruction to the transponder of the notified ID.

On the other hand, when all of them have emitted light (Yes), the light emission completion search unit 32 notifies the light emission instruction unit 33 of the information representing that all of them have emitted light. The light emission instruction unit 33 that has received this notification stops the light emission instruction to the transponders 12a to 13n at step S10. With this stop instruction, the transponders 12a to 13n stop the light emission.

Effects of First Embodiment

Next, effects of the inter-transmission device connection registration device 30A of the first embodiment are described. It should be noted that as various transmission devices, the n transponders 12a to 12n and then transponders 13a to 13n, the n photo couplers 14a to 14n, the first WSS 15, the n second WSSs 16a to 16n are subordinately connected.

The registration device 30A includes the storage unit 31, the light emission instruction unit 33, the transmission/reception detection unit 34, and the registration control unit 35.

The storage unit 31 stores connection information W2a (FIG. 3) of a case where divided various transmission devices (e.g., the transponder 12a and the photo coupler 14a) are connected through the port o and the port i1 is stored and registered.

The light emission instruction unit 33 provides a light emission instruction to a transmission device (e.g., the transponder 12a) that can emit light on one end side in subordinately connected transmission devices (e.g., the transponder 12a, the photo coupler 14a, the first WSS 15 and the second WSS 16a).

The transmission/reception detection unit 34 detects a light transmission and a light reception of opposing ports o and i1 between transmission devices (e.g., between the transponder 12a and photo coupler 14) in accordance with the light emission instruction.

The registration control unit 35 performs a control of registering, in the storage unit 31, the connection information W2a of the port o of the light transmission side and the port i1 of the light reception side that are detected.

With this configuration, when a transmission device on one end side (e.g., the transponder 12a) of subordinately connected transmission devices is caused to emit light, the light transmission is performed from the port o of the transmission device that has emitted light, and the light is received at the port i1 of the transmission device on the opposite side (the photo coupler 14a). Further, in the transmission devices in the subordinate connection relationship (e.g., the transponder 12a, the photo coupler 14a, the first WSS 15 and the second WSS 16a), the light transmission is performed from the port o3 of the transmission device on the opposite side of the light reception port i1 and the light is received at the port i2 of the transmission device (the first WSS 15) on the opposite side.

The connection information W4a of the opposing ports o3 and i2 where the light transmission and light reception are detected is registered in the storage unit 31. In this manner, the connection information between transmission devices can be automatically registered in the storage unit 31. Thus, at the time of the connection between various transmission devices, each connection information can be automatically registered, and this registration can be readily performed with no error.

In addition, the light emission completion search unit 32, the light emission instruction unit 33 and the transmission/reception detection unit 34 can be composed of the function provided as standard in the OpS 20, and the storage unit 31 can be composed of a storage medium such as a semiconductor memory and a hard disk provided as standard in the OpS 20, and thus, the device cost can be suppressed.

Modifications of First Embodiment

A plurality of the transmission devices that can emit light on one end side (e.g., the transponders 12a to 13n) are disposed in parallel, and other transmission devices (the photo couplers 14a to 14n, the first WSS 15 and the second WSSs 16a to 16n) are subordinately connected through the port o for the transmission devices disposed in parallel.

In this case, the light emission instruction unit 33 is configured to provide an instruction that causes the plurality of transmission devices disposed in parallel (the transponders 12a to 13n) to simultaneously emit light at different wavelengths.

With this configuration, by causing the transmission devices disposed in parallel (the transponders 12a to 13n) to simultaneously emit light at different wavelengths, optical signals of different wavelengths transmitted in parallel are transmitted to the subordinately connected transmission devices (the photo couplers 14a to 14n, the first WSS 15 and the second WSSs 16a to 16n) for the transmission devices disposed in parallel (the transponders 12a to 13n). Thus, after the connection of the subordinately connected transmission devices for the transmission paths disposed in parallel, the connection information between all transmission devices (the transponders 12a to 13n, the photo couplers 14a to 14n, the first WSS 15 and the second WSSs 16a to 16n) can be automatically registered, and this registration can be readily performed with no error.

Configuration of Second Embodiment

Figure 4:
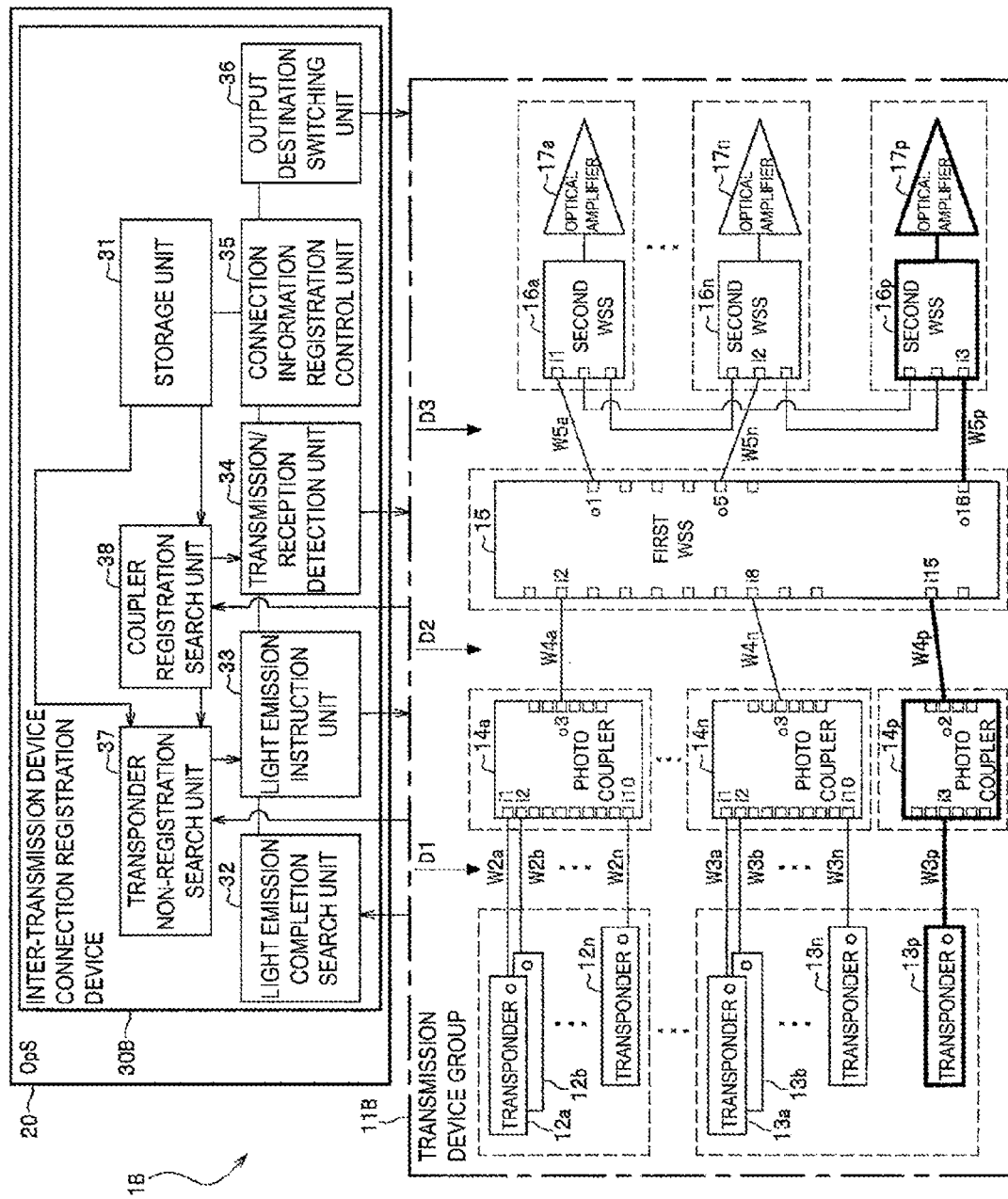
FIG. 4 is a block diagram illustrating a configuration of a transmission system using an inter-transmission device connection registration device according to a second embodiment of the present invention.

FIG. 4 is a block diagram illustrating a configuration of a transmission system using an inter-transmission device connection registration device according to a second embodiment of the present invention.

A transmission system 1B of the second embodiment illustrated in FIG. 4 is different from the transmission system 1A of the first embodiment (FIG. 1) in that an inter-transmission device connection registration device 30B automatically performs registration of connection information between transmission devices in additionally provided transmission devices.

Suppose here that in a transmission device group 11B, a transponder 13p, a photo coupler 14p, and a second WSS 16p to which an optical amplifier 17p is connected are additionally provided. Suppose that after they are additionally provided, the port o of the transponder 13p and the port i3 of the photo coupler 14p are connected to each other with the optical fiber, and likewise, a port o2 of the photo coupler 14p and a port i15 of the first WSS 15 are connected to each other, and, the port o16 of the first WSS 15 and the port i3 of the second WSS 16p are connected to each other.

Further, the connection information and the opposing port IDs of the connection are stored in a connection table 40B illustrated in FIG. 5 held in the registration control unit 35. Specifically, as shown in the end line in the connection table 40B, the port ID "13p-o" of the transponder 13p and the port ID "14p-i3" of the photo coupler 14p that are additionally provided are stored. Further, the connection information D1 "W3p" of the opposing ports of the port IDs "13p-o and 14p-i3" is stored.

Likewise, the port ID "14p-o2" of the photo coupler 14p and the port ID "15-i15" of the first WSS 15 are stored. Further, the connection information D2 "W4p" of the opposing ports of the port IDs "14p-o2 and 15-i15" is stored. In addition, the port ID "15-o16" of the first WSS 15 and the port ID "16a-i3" of the second WSS 16a are stored. Further, the connection information D3 "W5p" of the opposing ports of the port IDs "15-o16 and 16a-i3" is stored.

The registration device 30B illustrated in FIG. 4 includes, in addition to the components of the registration device 30A of the first embodiment (FIG. 1), a transponder non-registration search unit (non-registration search unit) 37 and a coupler registration search unit (registration search unit) 38. Note that the non-registration search unit 37 and the registration search unit 38 are composed of software for the process thereof provided in the OpS 20.

The transponder non-registration search unit 37 sequentially searches for the ID of each of the transponders 12a to 13n and 13p, and searches whether the connection information of the transponder corresponding to the ID is not registered (connection unregistered) in the storage unit 31. When there is no transponder whose connection is not registered, or in other words, the connection information of all the transponders 12a to 13n and 13p is already registered, a notification of the information representing that there is no transponder whose connection is not registered is provided to the light emission instruction unit 33. The light emission instruction unit 33 that has received this notification stops the light emission instruction.

On the other hand, when there is a transponder whose connection is not registered, the transponder non-registration search unit 37 provides a notification of the transponder ID of the transponder whose connection is not registered (e.g., the ID of the transponder 12*p*) to the light emission instruction unit 33. The light emission instruction unit 33 that has received this notification provides a light emission instruction of the transponder 12*p* whose connection is not registered. This light emission instruction is provided such that the transponder 12*p* emits light at an unused wavelength other than the wavelengths that have already been used for the light emission.

The coupler registration search unit 38 searches the storage unit 31 for whether the connection information of the output port o2 corresponding to the input port i3 whose connection information is already registered at the additional photo coupler (e.g., the photo coupler 14*p*), and the input port i15 of the first WSS 15 opposing the photo coupler 14*p* is already registered. When this search determines that it is registered, the coupler registration search unit 38 notifies the transponder non-registration search unit 37 of the already registered information. In this case, the transponder non-registration search unit 37 further continues the process of searching for transponders whose connection is not registered.

On the other hand, when the search determines that the connection is unregistered, the coupler registration search unit 38 notifies the transmission/reception detection unit 34 of the information about the unregistered connection. In this case, the transmission/reception detection unit 34 performs a reception detection process of the input port i of the first WSS 15.

Operation of Second Embodiment

Next, an operation of inter-transmission device connection registration at the registration device 30B according to the second embodiment is described with reference to the flowchart illustrated in FIG. 6.

Suppose here that in the transmission device group 11B illustrated in FIG. 4, as various transmission devices, the transponder 13*p*, the photo coupler 14*p*, the second WSS 16*p* to which the optical amplifier 17*p* is connected are additionally provided. Suppose that after they are additionally provided, the transmission devices are connected to each other, and the connection information and the opposing port IDs of the connection are stored in the connection table 40B illustrated in FIG. 5.

Figure 6:
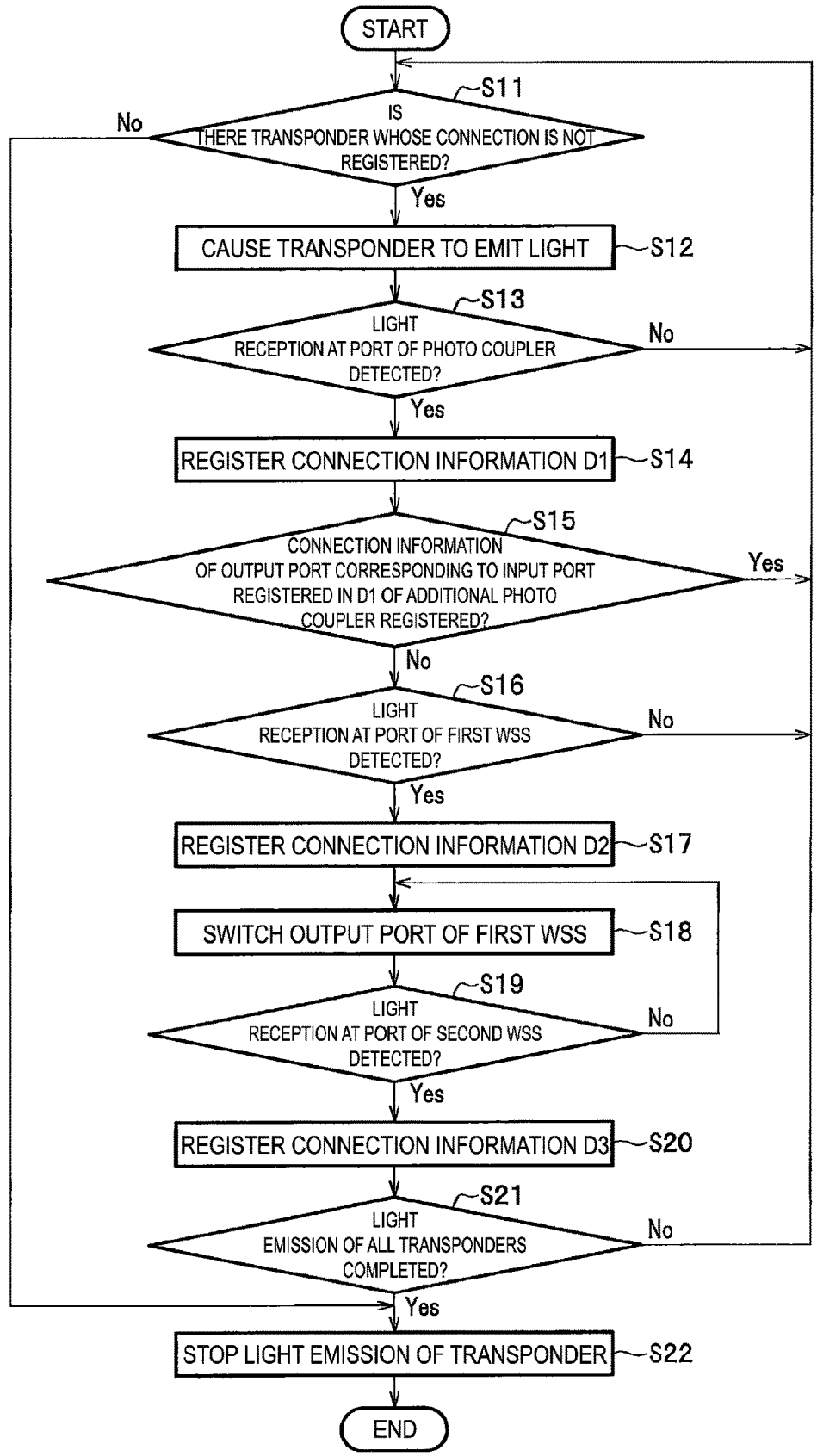
FIG. 6 is a flowchart for describing an operation of inter-transmission device connection registration by the inter-transmission device connection registration device of the second embodiment.

At step S11 illustrated in FIG. 6, the transponder non-registration search unit 37 searches the storage unit 31 for a transponder whose connection information is not registered among all the sequentially detected transponders 12*a* to 13*n* and 13*p*. This search determines whether there is an unregistered transponder.

When it is determined that there is no unregistered transponder (No), the process proceeds to step S22, and the transponder non-registration search unit 37 notifies the light emission instruction unit 33 of the information representing that there is no unregistered transponder. The light emission instruction unit 33 that has received this notification stops the light emission instruction, and thus light emission of all transponders 12*a* to 13*n* is stopped.

On the other hand, when it is determined at the step S11 that there is an unregistered transponder (Yes), the transponder non-registration search unit 37 notifies the light emission instruction unit 33 of the unregistered transponder ID (e.g., the ID of the transponder 12*p*) at step S12. The light emission instruction unit 33 that has received this notification provides an instruction for causing the unregistered transponder 12*p* to emit light at an unused wavelength $\lambda p$. In accordance with this instruction, the transponder 12*p* emits light at the wavelength $\lambda p$, and outputs (transmits) an optical signal of the wavelength from the port o to the port i3 of the photo coupler 14*p* as the connection destination.

Next, at step S13, the transmission/reception detection unit 34 determines whether a light reception has been detected at the port i3 of the photo coupler 14*p*. When no light reception has been detected (No), the process is returned to the step S11, and whether there is an unregistered transponder is determined.

On the other hand, suppose that it is determined at the step S13 that a light reception at the port i3 of the photo coupler 14*p* has been detected (Yes). In this case, the transmission/reception detection unit 34 also detects a light transmission of the port o of the transponder 12*p* that has performed the output (transmission) of the optical signal to the light reception port i3.

Next, at step S14, with the connection table 40B (FIG. 5), the registration control unit 35 cross-checks information "12*p*-o" about the port o of the transponder 12*p* where the light transmission has been detected by the transmission/reception detection unit 34, and information "14*p*-i3" about the port i3 of the photo coupler 14*p* where the light reception has been detected by the transmission/reception detection unit 34, and registers the connection information D1 "W3*p*" retrieved as a result of this in the storage unit 31.

Next, at step S15, the coupler registration search unit 38 searches the storage unit 31 for whether connection information with the input port i15 of the first WSS 15 on the opposite side is already registered at the output port o2 corresponding to input port i3 whose connection information is already registered in additional photo coupler 14*p*. This search determines whether the connection information is already registered.

When it is determined that the connection is already registered (Yes), the process is returned to step S11, and the coupler registration search unit 38 notifies the transponder non-registration search unit 37 of the already registered information. In accordance with this notification, the transponder non-registration search unit 37 searches for the transponder whose connection is not registered.

On the other hand, when it is determined at the step S15 that the connection is not registered (No), the coupler registration search unit 38 notifies the transmission/reception detection unit 34 of information about the unregistered connection, at step S16. The transmission/reception detection unit 34 performs light reception detection at the input port i15 of the first WSS 15, and thus whether a light reception has been detected is determined. When no light reception has been detected (No), the process is returned to the step S11, and the transponder whose connection is not registered is searched for.

On the other hand, suppose that it is determined at the step S16 that a light reception at the port i15 of the first WSS 15 has been detected (Yes). In this case, the transmission/reception detection unit 34 simultaneously detects a light transmission of the port o2 of the photo coupler 14*p* that has performed the output of the optical signal to the light reception port i15 of the first WSS 15.

Next, at step S17, with the connection table 40B (FIG. 5), the registration control unit 35 cross-checks information "14p-o2" about the port o2 of the photo coupler 14p where the light transmission has been detected by the transmission/reception detection unit 34, and information "15-i15" about the port i15 of the first WSS 15 where the light reception has been detected by the transmission/reception detection unit 34, and registers the connection information D2 "W4p" retrieved as a result of this in the storage unit 31.

Next, at step S18, the output destination switching unit 36 performs switching to an output port o16 of the first WSS 15. The port o16 is connected to the port i3 of the second WSS 16p.

Next, at step S19, whether a light reception has been detected at the port i3 of the second WSS 16p by the transmission/reception detection unit 34 is determined. When no light reception has been detected (No), the process is returned to the step S18, and the output destination switching unit 36 switches the output port o of the first WSS 15.

On the other hand, suppose that it is determined at the step S19 that a light reception at the port i3 of the second WSS 16p has been detected by the transmission/reception detection unit 34 (Yes). In this case, the transmission/reception detection unit 34 simultaneously detects a light transmission of the port o16 of the first WSS 15 that has performed the output of the optical signal to the light reception port i3 of the second WSS 16p.

Next, at step S20, with the connection table 40B, the registration control unit 35 cross-checks information "15-o16" about the port o16 of the first WSS 15 where the light transmission has been detected by the transmission/reception detection unit 34, and information "16p-i3" about the port i3 of the second WSS 16p where the light reception has been detected by the transmission/reception detection unit 34, and registers the connection information D3 "W5p" retrieved as a result of this in the storage unit 31.

Next, at step S21, the light emission completion search unit 32 searches whether all the transponders 12a to 13n and 13p have emitted light. When not all of them have emitted light (No), the process is returned to step S11.

On the other hand, when all of them have emitted light (Yes), the light emission completion search unit 32 notifies the light emission instruction unit 33 of the information representing that all of them have emitted light. At step S22, the light emission instruction unit 33 that has received this notification stops the light emission instruction to all transponders 12a to 13n and 13p, and thus the light emission of all transponders 12a to 13n and 13p is stopped.

Effects of Second Embodiment

Next, effects of the inter-transmission device connection registration device 30B of the second embodiment are described. Suppose here that in the transmission device group 11B illustrated in FIG. 4, as various transmission devices, the transponder 13p, the photo coupler 14p, and the second WSS 16p to which the optical amplifier 17p is connected are additionally provided, and the transmission devices are connected after they are additionally provided, and, the connection information and the opposing port IDs of the connection are stored in the connection table 40B illustrated in FIG. 5.

The registration device 30B includes the transponder non-registration search unit 37, in addition to the storage unit 31, the light emission completion search unit 32, the light emission instruction unit 33, the transmission/reception detection unit 34, the connection information the registration control unit 35 and the output destination switching unit 36 of the first embodiment.

In the case where in the transmission device group 11B, the subordinately connected photo coupler 14p with the transponder 13p on one end side, and the second WSS 16p through the first WSS 15 are additionally provided, and the additionally provided transmission devices are connected to each other, the transponder non-registration search unit 37 searches the storage unit 31 for the information about the transponder 13p whose connection information is unregistered. When there is the unregistered transponder 13p as a result of the search, the light emission instruction unit 33 provides a light emission instruction to cause the unregistered transponder 13p to emit light at an unused wavelength $\lambda p$.

With this configuration, the additionally provided transponder 13p can be caused to appropriately emit light, and optical signals can be transmitted to the subordinately connected photo coupler 14p, and the second WSS 16p through the first WSS 15. In addition, since the transponder 13p is caused to emit light at an unused wavelength, the connection of additional transmission devices can be detected without affecting the optical signals during the operation.

The registration device 30B further includes the coupler registration search unit 38. The coupler registration search unit 38 searches whether, for the output port o2 corresponding to the input port i3 whose connection information is already registered in the storage unit 31 in the photo coupler 14p as the additional transmission device cascading connected to the transponders 12a to 13n, connection information with the input port i15 on the opposite side is already registered. When this search determines that the connection information of the output port o2 of the additional photo coupler 14p is unregistered, the transmission/reception detection unit 34 performs a process of detecting light reception of the input port i15 on the opposite side of the unregistered output port o2.

With this configuration, in the case where the output port o2 of the photo coupler 14p as a middle additional transmission device is not connected to the input port i15 of the first WSS 15 on the opposite side, a connection of the ports o2 and i15 can be appropriately detected thereafter.

Configuration of Third Embodiment

Figure 7:
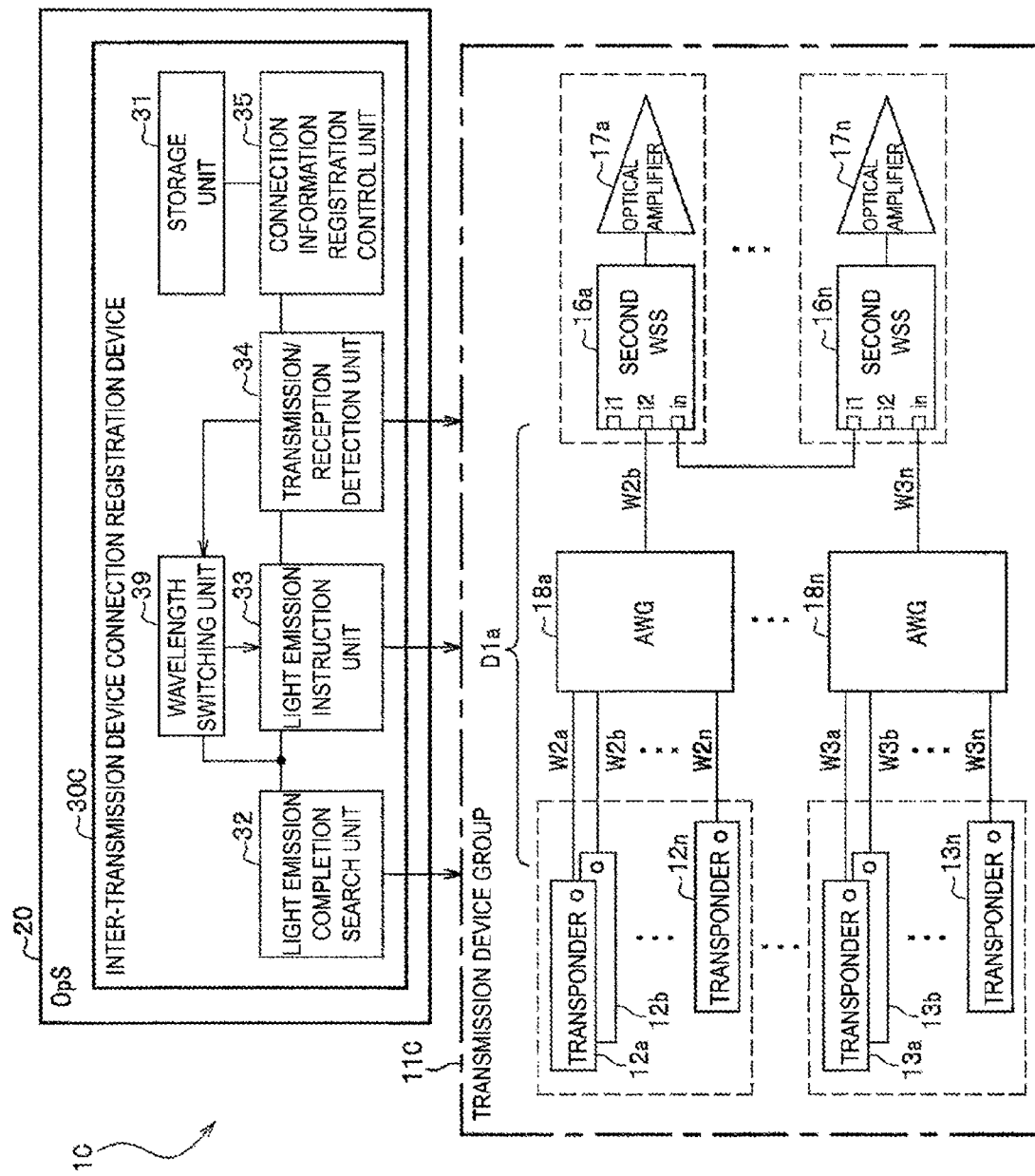
FIG. 7 is a block diagram illustrating a configuration of a transmission system using an inter-transmission device connection registration device according to a third embodiment of the present invention.

FIG. 7 is a block diagram illustrating a configuration of a transmission system using an inter-transmission device connection registration device according to a third embodiment of the present invention.

A transmission system 1C of the third embodiment illustrated in FIG. 7 is different from the transmission system 1A of the first embodiment (FIG. 1) in that a transmission device group 11C includes n arrayed waveguide gratings (AWGs) 18a to 18n and that the OpS 20 includes an inter-transmission device connection registration device 30C described later.

The transmission device group 11C has a configuration in which, as transmission devices as in the first embodiment, the n transponders 12a to 12n and the n transponders 13a to 13n, and the n second WSSs 16a to 16n are subordinately connected through the AWGs 18a to 18n.

The transponders 12a to 13n emit light at different wavelengths. The ports o of the transponders 12a to 12n are individually connected to the ports of the AWG 18a, and the ports on the opposite side of the AWG 18a are connected to the ports i1 to in of the second WSS 16a. In this example, suppose that the port on the opposite side of the AWG 18a is connected to the port i2 of the second WSS 16a. In this case, the port o of the transponder 12b is connected to the port i2 of the second WSS 16a through the AWG 18a, and the connection information D1a of the opposing ports is W2b.

In addition, the ports o of the transponders 13a to 13n are individually connected to the ports of the AWG 18n, and the ports on the opposite side of the AWG 18n are connected to the ports i1 to in of the second WSS 16n. In this example, suppose that the port on the opposite side of the AWG 18n is connected to the port i3 of the second WSS 16n. In this case, the port o of the transponder 13n is connected to the port in of the second WSS 16n through the AWG 18n, and the connection information D1a of the opposing ports is W3n.

The AWGs 18a to 18n have a processing function of bundling optical signals of different wavelengths into one, and, conversely, separating optical signals of different wavelengths bundled into one. On the basis of this function, the AWG 18a performs a process of transmitting, to the second WSS 16a, only an optical signal of one specific wavelength transmitted from the transponders 12a to 12n. Likewise, the AWG 18n performs a process of transmitting, to the second WSS 16n, only an optical signal of one specific wavelength transmitted from the transponders 13a to 13n.

Accordingly, only the optical signal sent from the port o of the transponder 12b is received at the port i2 of the second WSS 16a through the AWG 18a. Thus, in the case where the port o of the transponder 12b is connected to only the port i2 of the second WSS 16a through the AWG 18a, the optical signal from the port o of other transponders 12a and 12n is not received at the second WSS 16a through the AWG 18a.

Next, the inter-transmission device connection registration device 30A includes a wavelength switching unit 39, in addition to the storage unit 31, the light emission completion search unit 32, the light emission instruction unit 33, the transmission/reception detection unit 34 and the connection information the registration control unit 35 as in the first embodiment. Note that the wavelength switching unit 39 is composed of software for the process thereof provided in the OpS 20.

The wavelength switching unit 39 provides an instruction (switching instruction) for switching the light-emission wavelength of the transponders 12a to 13n to the light emission instruction unit 33. For example, the wavelength switching unit provides a switching instruction for sequentially switching the light-emission wavelengths of the transponders 12a to 12n of one functional block.

The light emission instruction unit 33 provides a light emission instruction to the transponders 12a to 13n that emit light at the wavelengths corresponding to the switching instruction.

The transmission/reception detection unit 34 detects a light transmission and a light reception at the ports of the transponders 12a to 13n and the second WSSs 16a to 16n.

When the light transmission and the light reception of the port are detected at the transmission/reception detection unit 34, the registration control unit 35 refers to a connection table 40C (FIG. 8), and stores and registers the connection information of the port of the light transmission and the port of the light reception in the storage unit 31.

The connection table 40C illustrated in FIG. 8 stores the port ID "12a-o" of the transponder 12a, and the port ID "16a-i1" of the second WSS 16a. Further, the connection table 40C stores the connection information D1a "W2a" of the opposing ports of the port IDs "12a-o and 16a-i1".

Likewise, the connection table 40C stores the port ID "12b-o" of the transponder 12b, the port ID "16a-i2" of the second WSS 16a, and the connection information D1a "W2b" of the opposing ports of the port IDs. The connection table 40C stores the port ID "12n-o" of the transponder 12n, the port ID "16a-in" of the second WSS 16a, and the connection information D1a "W2n" of the opposing ports of the port IDs.

Further, the connection table 40C stores the port ID "13a-o" of the transponder 13a, the port ID "16n-i1" of the second WSS 16n, the connection information D1a "W3a" of the opposing ports of the port IDs. Likewise, the connection table 40C stores the port ID "13b-o" of the transponder 13b, the port ID "16n-i2" of the second WSS 16n, and the connection information D1a "W3b" of the opposing ports of the port IDs. The connection table 40C stores the port ID "13n-o" of the transponder 13n, the port ID "16n-in" of the second WSS 16n, and the connection information D1a "W3n" of the opposing ports of the port IDs.

The registration control unit 35 stores connection information W2b in the storage unit 31 when a light transmission of the port ID "12b-o" of the transponder 12b and a light reception of the port ID "16a-i2" of the second WSS 16a are detected by the transmission/reception detection unit 34, for example.

After the registration of the connection information D1a in the storage unit 31, the light emission completion search unit 32 sequentially searches whether all the transponders 12a to 13n have emitted light. When there is a transponder that has not emitted light, the light emission completion search unit 32 notifies the wavelength switching unit 39 of the transponder ID thereof. The wavelength switching unit 39 outputs, to the light emission instruction unit 33, a switching instruction for switching to the transponder of that notification. The light emission instruction unit 33 provides a light emission instruction to the transponder of the switching instruction.

When it is detected that all transponders 12a to 13n have emitted light in the search, the light emission completion search unit 32 notifies the light emission instruction unit 33 of the information representing that all of them have emitted light through the wavelength switching unit 39. The light emission instruction unit 33 that has received this notification stops the light emission instruction.

Operation of Third Embodiment

Figure 9:
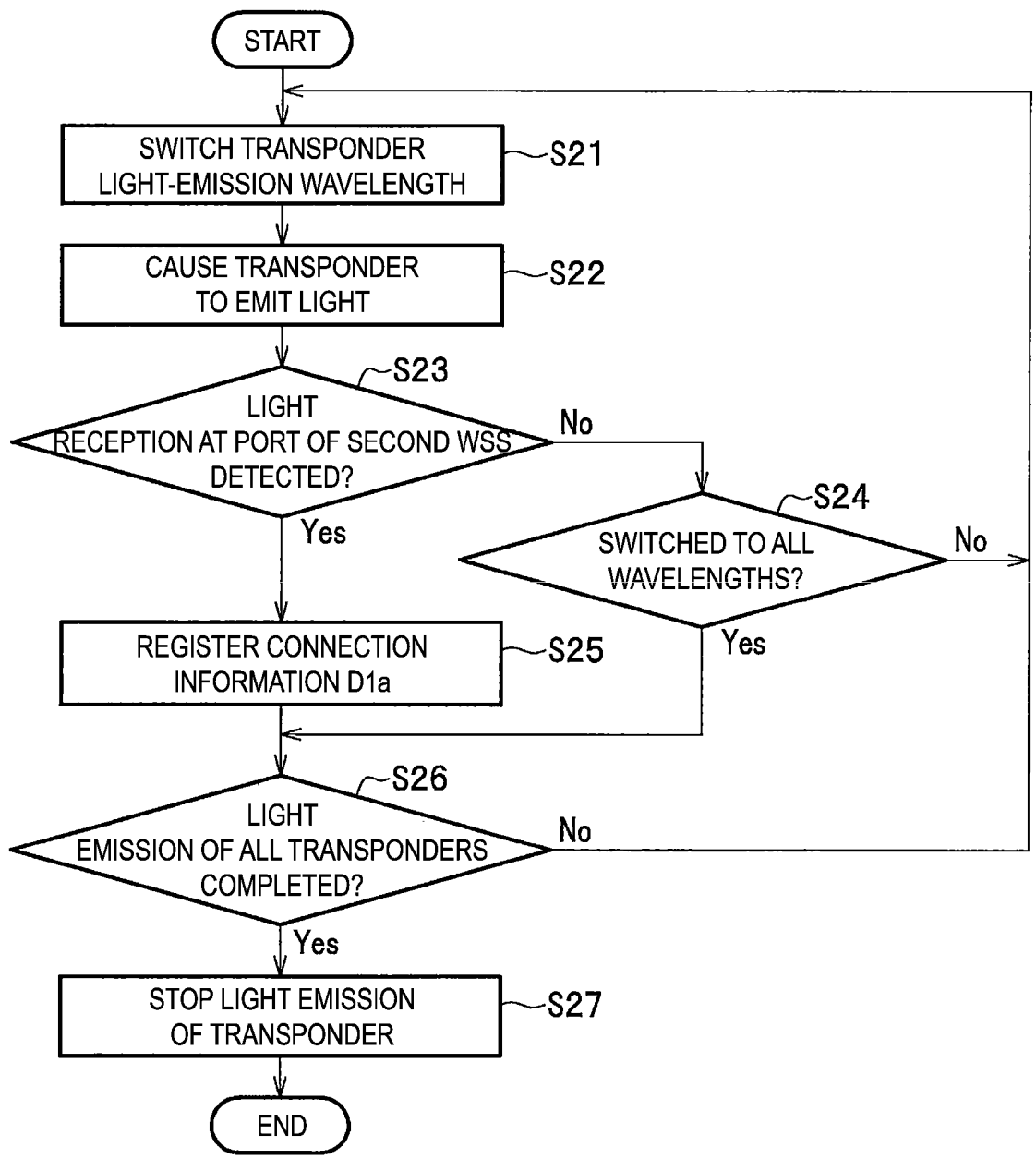
FIG. 9 is a flowchart for describing an operation of inter-transmission device connection registration by the inter-transmission device connection registration device of the third embodiment.
Figure 10:
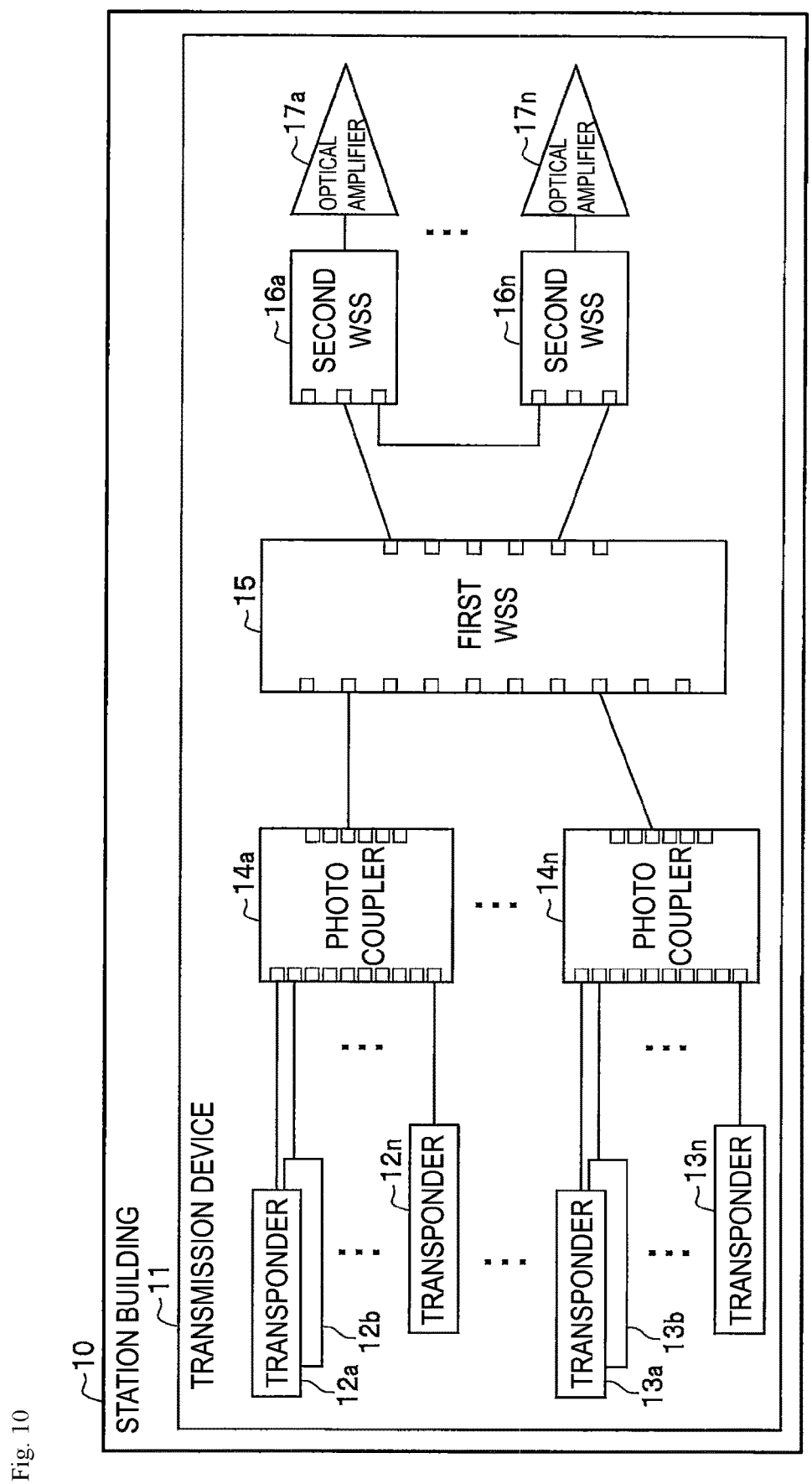
FIG. 10 is a block diagram illustrating a state where various transmission devices are wired and connected in a known transmission device.

Next, an operation of inter-transmission device connection registration of the registration device 30C according to the third embodiment is described with reference to the flowchart illustrated in FIG. 9.

At step S21, the wavelength switching unit 39 provides a switching instruction of the light-emission wavelength of the transponders 12a to 13n to the light emission instruction unit 33. For example, the wavelength switching unit provides a switching instruction for switching to the transponder 12a of the light-emission of the wavelength $\lambda a$.

At step S22, suppose that the light emission instruction unit 33 provides a light emission instruction to the transponder 12a in accordance with the switching instruction, and the transponder 12a emits light at the wavelength $\lambda a$ in response to this instruction. However, the port of the AWG 18a is not connected to the port i1 of the second WSS 16a that receives the optical signal of the wavelength $\lambda a$ from the transponder 12a. As such, the optical signal of the wavelength $\lambda a$ from the port o of the transponder 12a is not received at the port i1 of the second WSS 16a through the AWG 18a.

Therefore, at step S23, the transmission/reception detection unit 34 does not detect light reception at the port i1 of the second WSS 16a (No).

Therefore, at step S24, it is determined whether switching to all wavelengths has been performed at the wavelength switching unit 39. When the switching to all wavelengths has not been performed (No), the process is returned to step S21.

Returning to step S21, the wavelength switching unit 39 provides a switching instruction for switching to the next transponder 12b of the light-emission of the wavelength λb.

Next, at step S22, suppose that the light emission instruction unit 33 provides a light emission instruction to the transponder 12b in accordance with the switching instruction, and the transponder 12b emits light at the wavelength λb. In accordance with this light emission, the optical signal of the wavelength λb sent from the port o of the transponder 12b is received at the port i2 of the second WSS 16a through the AWG 18a.

Thus, at step S23, the transmission/reception detection unit 34 detects a light reception at the port i2 of the second WSS 16a (Yes). In this case, the transmission/reception detection unit 34 also detects a light transmission of the port o of the transponder 12b.

Next, at step S25, with the connection table 40C (FIG. 8), the registration control unit 35 cross-checks information "12b-o" about the port o of the transponder 12b where the light transmission has been detected by the transmission/reception detection unit 34, and information "16a-i2" about the port i2 of the second WSS 16a where the light reception has been detected by the transmission/reception detection unit 34, and registers the connection information D1 "W2b" retrieved as a result of this in the storage unit 31. After the registration, the process proceeds to step S26.

When it is determined at step S24 that switching to all wavelengths has been performed (Yes), the process also proceeds to step S26.

Next, at step S26, the light emission completion search unit 32 searches whether all the transponders 12a to 13n have emitted light. When not all of them have emitted light (No), the process is returned to step S21.

On the other hand, when all of them have emitted light (Yes), the light emission completion search unit 32 notifies the light emission instruction unit 33 of the information representing that all of them have emitted light. At step S27, the light emission instruction unit 33 that has received this notification stops the light emission instruction to the transponders 12a to 13n, and thus the transponders 12a to 13n stop the light emission.

Effects of Third Embodiment

Next, effects of the inter-transmission device connection registration device 30C of the third embodiment are described. It should be noted that as various transmission devices, the n transponders 12a to 12n and then transponders 13a to 13n, and the n second WSSs 16a to 16n are subordinately connected through the AWGs 18a to 18n.

The registration device 30C includes the storage unit 31, the light emission instruction unit 33, the transmission/reception detection unit 34, the registration control unit 35, and the wavelength switching unit 39.

The storage unit 31 stores and registers connection information of a case where the second WSSs 16a to 16n as other transmission devices are subordinately connected to the transponders 12a to 13n as a plurality of light emitting transmission devices disposed in parallel through the AWGs 18a to 18n.

The wavelength switching unit 39 provides a switching instruction of the light-emission wavelength corresponding to the parallel transponders 12a to 13n connected to the input side of the AWGs 18a to 18n.

The light emission instruction unit 33 provides a light emission instruction to the transponder (e.g., the transponder 12b) corresponding to the light-emission wavelength of the switching instruction.

The transmission/reception detection unit 34 detects a light transmission and a light reception at the opposing ports o and i2 between the transponder 12b and the second WSS 16a through the AWG 18a at light emission based on the light emission instruction.

The registration control unit 35 performs a control of registering the connection information W2a of the port o of the light transmission side and the port i2 of the light reception side that are detected, in the storage unit 31.

Then, during light transmission from the port o of the transponder 12b that has emitted light in accordance with the switching instruction of the wavelength switching unit 39, a light reception at the port i2 of the second WSS 16a through the AWG 18a is detected by the transmission/reception detection unit 34. At this time, the registration control unit 35 registers, in the storage unit 31, the connection information "W2b" of the port o of the light transmission side and the port i2 of the light reception side that are detected, and in the case where it is not detected, the wavelength switching unit 39 provides the next switching instruction.

With this configuration, in the configuration where the second WSSs 16a to 16n are subordinately connected to the plurality of parallel transponders 12a to 13n through the AWGs 18a to 18n, the transponders 12a to 13n that emit light at different wavelengths can be caused to sequentially emit light one by one, and the connection information of the opposing ports between the transponders 12a to 13n and the second WSSs 16a to 16n through the AWGs 18a to 18n can be automatically registered in the storage unit 31.

Next, a first program that is executed by a computer according to the present embodiment is described. Suppose that the computer is the inter-transmission device connection registration device 30A that stores and registers, in the storage unit 31, connection information of a case where divided various transmission devices (the transponders 12a to 13n, the photo couplers 14a to 14n, the first WSS 15, and the second WSSs 16a to 16n) are connected through opposing ports.

The first program causes the computer to function as a means for providing a light emission instruction to the transponders 12a to 13n as light emitting transmission devices disposed on one end side in subordinately connected transmission devices, a means for detecting a light transmission and a light reception at the opposing ports between the transmission devices at light emission of the transponders 12a to 13n, and a means for registering, in the storage unit 31, connection information of a port on a light transmission side and a port on a light reception side that are detected.

With this first program, the same effect as that of the above-described inter-transmission device connection registration device 30A can be achieved.

In addition, a second program that is executed by the computer is described. Suppose that the computer is the inter-transmission device connection registration device 30C that stores and registers, in the storage unit 31, connection information of a case where the transponders 12a to 13n as a plurality of parallel light emitting transmission devices are respectively subordinately connected to the second WSSs 16a to 16n as other transmission devices through the AWGs 18a to 18n.

The second program causes the computer to function as a means for providing a switching instruction of the light-emission wavelength corresponding to the parallel transponders 12a to 13n connected to the input side of the AWGs 18a to 18n, a means for providing a light emission instruction to a transponder (e.g., the transponder 12b) corresponding to the light-emission wavelength of the switching instruction, a means for detecting a light transmission and a light reception at the opposing ports between the transponder 12b and the second WSS 16a through the AWG 18 at light emission based on the light emission instruction, a means for registering, in the storage unit 31, connection information of a port on a light transmission side and a port on a light reception side that are detected, a means for registering, in the storage unit 31, the connection information W2b of the port o of the light transmission side and the port i2 of the light reception side that are detected when a light reception at the port i2 of the second WSS 16a through the AWG 18a is detected during light transmission from the port o of the transponder 12b that has emitted light in accordance with the switching instruction, and a means for providing the switching instruction when the light reception at the port i1 of the second WSS 16a through the AWG 18a is not detected.

With this second program, the same effect as that of the inter-transmission device connection registration device 30C can be achieved.

Effects (1) An inter-transmission device connection registration device includes: a storage unit configured to store and register connection information of a case where divided various transmission devices are connected through opposing ports; a light emission instruction unit configured to provide a light emission instruction to a light emitting transmission device disposed on one end side in transmission devices that are subordinately connected; a transmission/reception detection unit configured to detect a light transmission and a light reception at the opposing ports between the transmission devices in accordance with the light emission instruction; and a registration control unit configured to perform a control of registering, in the storage unit, connection information about a port on a light transmission side and a port on a light reception side that are detected.

With this configuration, when a transmission device on one end side of subordinately connected transmission devices is caused to emit light, the light transmission is performed from the port of the transmission device that has emitted light, and the light is received at the port of the transmission device on the opposite side. Further, in the transmission devices in the subordinate connection relationship, the light transmission is performed from the port of the transmission device on the opposite side of the light reception port and the light is received at the port of the transmission device on the opposite side of the port of the transmission device that has emitted light. The connection information of the opposing ports where the light transmission and light reception are detected is registered in the storage unit. In this manner, the connection information between transmission devices can be automatically registered in the storage unit. Thus, at the time of the connection between various transmission devices, each connection information can be automatically registered, and this registration can be readily performed with no error.

(2) In the inter-transmission device connection registration device according to (1), in a configuration in which a plurality of the light emitting transmission devices are disposed in parallel, and other transmission devices are subordinately connected to the transmission devices disposed in parallel through ports, the light emission instruction unit provides an instruction for causing the light emitting transmission devices disposed in parallel to simultaneously emit light at different wavelengths.

With this configuration, light emitting transmission devices disposed in parallel are caused to simultaneously emit light at different wavelengths, and thus optical signals of different wavelengths transmitted in parallel are transmitted to the transmission devices subordinately connected to the light emitting transmission devices disposed in parallel. In this manner, after the connection between the transmission devices subordinately connected to the light emitting transmission devices disposed in parallel, the connection information between all transmission devices can be automatically registered, and this registration can be readily performed with no error.

(3) The inter-transmission device connection registration device according to (1) or (2) further includes a non-registration search unit configured to search the storage unit for information about the light emitting transmission device whose connection information is not registered in a case where transmission devices subordinately connected with a light emitting transmission device on one end side are additionally provided, and the additionally provided transmission devices are connected to each other. When there is a light emitting transmission device that is not registered as a result of a search by the non-registration search unit, the light emission instruction unit provides a light emission instruction for causing the light emitting transmission device that is not registered to emit light at an unused wavelength.

With this configuration, when transmission devices subordinately connected with a light emitting transmission device on one end side are additionally provided, the additionally provided light emitting transmission devices can be caused to appropriately emit light, and thus an optical signal can be transmitted to the subordinately connected additional transmission device. In addition, since the light emitting transmission device is caused to emit light at an unused wavelength, a connection of additional transmission devices can be detected without affecting optical signals in operation.

(4) The inter-transmission device connection registration device according to (3) further includes a registration search unit configured to search whether connection information to an input port on an opposite side is already registered for an output port corresponding to an input port whose connection information is already registered in the storage unit in the additionally provided transmission device cascading connected to the light emitting transmission device. When the connection information of the output port of the additionally provided transmission device is not registered as a result of a search by the registration search unit, the transmission/reception detection unit performs a process of detecting a light reception at the input port on an opposite side of the output port that is not registered.

With this configuration, in the case where the output port of the middle transmission device of the additional transmission devices is not connected to the input port of the opposite side, the connection of the ports can be appropriately detected thereafter.

(5) An inter-transmission device connection registration device includes: a storage unit configured to store and register connection information of a case where other transmission devices are subordinately connected to a plurality of light emitting transmission devices disposed in parallel through arrayed waveguide gratings (AWGs); a wavelength switching unit configured to provide a switching instruction of a light-emission wavelength corresponding to a light emitting transmission device of parallel light emitting transmission devices connected on an input side of the AWG; a light emission instruction unit configured to provide a light emission instruction to the light emitting transmission device corresponding to the light-emission wavelength of the switching instruction; a transmission/reception detection unit configured to detect a light transmission and a light reception at opposing ports between the transmission devices through the AWG at light emission based on the light emission instruction; and a registration control unit configured to perform a control of registering connection information of a port on a light transmission side and a port on a light reception side that are detected in the storage unit. When a light reception at a port of a transmission device through the AWG is detected by the transmission/reception detection unit at light transmission from a port of the light emitting transmission device that has emitted light in accordance with the switching instruction of the wavelength switching unit, the registration control unit registers, in the storage unit, connection information of a port on a light transmission side and a port on a light reception side that are detected. When no light reception is detected, the wavelength switching unit provides a next switching instruction.

With this configuration, in a configuration in which other transmission devices are subordinately connected to a plurality of light emitting transmission devices disposed in parallel through the AWG, the connection information of the opposing ports between the transmission devices through the AWG can be automatically registered by causing the light emitting transmission devices that emit light at different wavelengths to sequentially emit light one by one.

(6) An inter-transmission device connection registration method of an inter-transmission device connection registration device configured to store and register, in a storage unit, connection information of a case where divided various transmission devices are connected through opposing ports, includes: providing, by the inter-transmission device connection registration device, a light emission instruction to a light emitting transmission device disposed on one end side in subordinately connected transmission devices; detecting, by the inter-transmission device connection registration device, a light transmission and a light reception at the opposing ports between the transmission devices in accordance with the light emission instruction; and performing, by the inter-transmission device connection registration device, a control of registering, in the storage unit, connection information about a port on a light transmission side and a port on a light reception side that are detected.

With this method, the same operation and effect as those of the inter-transmission device connection registration device according to the (1) can be achieved.

(7) An inter-transmission device connection registration method of an inter-transmission device connection registration device configured to store and register, in a storage unit, connection information of a case where other transmission devices are subordinately connected to a plurality of light emitting transmission devices disposed in parallel through arrayed waveguide gratings (AWGs) includes: providing, by the inter-transmission device connection registration device, a switching instruction of a light-emission wavelength corresponding to a light emitting transmission device of parallel light emitting transmission devices connected on an input side of the AWG; providing, by the inter-transmission device connection registration device, a light emission instruction to the light emitting transmission device corresponding to the light-emission wavelength of the switching instruction; detecting, by the inter-transmission device connection registration device, a light transmission and a light reception at opposing ports between the transmission devices through the AWG at light emission based on the light emission instruction; performing, by the inter-transmission device connection registration device, a control of registering, in the storage unit, connection information of a port on a light transmission side and a port on a light reception side that are detected; registering, by the inter-transmission device connection registration device, in the storage unit, connection information of a port on a light transmission side and a port on a light reception side that are detected when a light reception at a port of a transmission device through the AWG is detected at light transmission from a port of the light emitting transmission device that has emitted light in accordance with the switching instruction; and providing, by the inter-transmission device connection registration device, the switching instruction when a light reception at the port of the transmission device through the AWG is not detected.

With this method, the same operation and effect as those of the inter-transmission device connection registration device according to the (5) can be achieved.

(8) A program configured to cause a computer to function as the inter-transmission device connection registration device according to any one of (1) to (4).

With this program, the same operation and effect as those of the inter-transmission device connection registration device according to any one of the (1) to (4) can be achieved.

Other specific configurations may be modified as necessary without departing from the gist of the present invention.

REFERENCE SIGNS LIST

11A, 11B, 11C Transmission device group
12a to 12n, 13a to 13n, 13p Transponder
14a to 14n, 14p Photo coupler
15 First WSS
16a to 16n, 16p Second WSS
17a to 17n, 17p Optical amplifier
20 OpS
30A, 30B, 30C Inter-transmission device connection registration device
31 Storage unit
32 Light emission completion search unit
33 Light emission instruction unit
34 Transmission/reception detection unit
35 Connection information registration control unit
36 Output destination switching unit
37 Transponder non-registration search unit
38 Coupler registration search unit
39 Wavelength switching unit

The invention claimed is:
1. An inter-transmission device connection registration device comprising:
a storage unit, including one or more processors, configured to store and register connection information of a case where divided various transmission devices are connected through opposing ports;
a light emission instruction unit, including one or more processors, configured to provide a light emission instruction to a light emitting transmission device disposed on one end side in transmission devices that are subordinately connected;
a transmission/reception detection unit, including one or more processors, configured to detect a light transmission and a light reception at the opposing ports between the transmission devices in accordance with the light emission instruction;
a registration control unit, including one or more processors, configured to perform a control of registering, in the storage unit, connection information about a port on a light transmission side and a port on a light reception side that are detected; and
a non-registration search unit, including one or more processors, configured to search the storage unit for information about the light emitting transmission device whose connection information is not registered in a case where transmission devices subordinately connected with a light emitting transmission device on one end side are additionally provided, and the additionally provided transmission devices are connected to each other, wherein
when there is a light emitting transmission device that is not registered as a result of a search by the non-registration search unit, the light emission instruction unit is configured to provide a light emission instruction for causing the light emitting transmission device that is not registered to emit light at an unused wavelength.

2. The inter-transmission device connection registration device according to claim 1, wherein in a configuration in which a plurality of the light emitting transmission devices are disposed in parallel, and other transmission devices are subordinately connected to the transmission devices disposed in parallel through ports, the light emission instruction unit is configured to provide an instruction for causing the light emitting transmission devices disposed in parallel to simultaneously emit light at different wavelengths.

3. The inter-transmission device connection registration device according to claim 1, further comprising a registration search unit, including one or more processors, configured to search whether connection information to an input port on an opposite side is already registered for an output port corresponding to an input port whose connection information is already registered in the storage unit in the additionally provided transmission device cascading connected to the light emitting transmission device, wherein
when the connection information of the output port of the additionally provided transmission device is not registered as a result of a search by the registration search unit, the transmission/reception detection unit is configured to perform a process of detecting a light reception at the input port on an opposite side of the output port that is not registered.

4. A non-transitory computer-readable medium storing a program configured to cause a computer to function as the inter-transmission device connection registration device according to claim 1.

5. An inter-transmission device connection registration device comprising:
a storage unit, including one or more processors, configured to store and register connection information of a case where other transmission devices are subordinately connected to a plurality of light emitting transmission devices disposed in parallel through arrayed waveguide gratings (AWGs);
a wavelength switching unit, including one or more processors, configured to provide a switching instruction of a light-emission wavelength corresponding to a light emitting transmission device of parallel light emitting transmission devices connected on an input side of the AWG;
a light emission instruction unit, including one or more processors, configured to provide a light emission instruction to the light emitting transmission device corresponding to the light-emission wavelength of the switching instruction;
a transmission/reception detection unit, including one or more processors, configured to detect a light transmission and a light reception at opposing ports between the transmission devices through the AWG at light emission based on the light emission instruction; and
a registration control unit, including one or more processors, configured to perform a control of registering connection information of a port on a light transmission side and a port on a light reception side that are detected in the storage unit, wherein
when a light reception at a port of a transmission device through the AWG is detected by the transmission/reception detection unit at light transmission from a port of the light emitting transmission device that has emitted light in accordance with the switching instruction of the wavelength switching unit, the registration control unit is configured to register, in the storage unit, connection information of a port on a light transmission side and a port on a light reception side that are detected, and
when no light reception is detected, the wavelength switching unit is configured to provide a next switching instruction.

6. An inter-transmission device connection registration method of an inter-transmission device connection registration device configured to store and register, in a storage unit, connection information of a case where divided various transmission devices are connected through opposing ports, the method comprising:
providing, by the inter-transmission device connection registration device, a light emission instruction to a light emitting transmission device disposed on one end side in subordinately connected transmission devices;
detecting, by the inter-transmission device connection registration device, a light transmission and a light reception at the opposing ports between the transmission devices in accordance with the light emission instruction;
performing, by the inter-transmission device connection registration device, a control of registering, in the storage unit, connection information about a port on a light transmission side and a port on a light reception side that are detected;
searching the storage unit for information about the light emitting transmission device whose connection information is not registered in a case where transmission devices subordinately connected with a light emitting transmission device on one end side are additionally provided, and the additionally provided transmission devices are connected to each other; and
when there is a light emitting transmission device that is not registered as a result of a search, providing a light emission instruction for causing the light emitting transmission device that is not registered to emit light at an unused wavelength.

7. The inter-transmission device connection registration method according to claim 6, further comprising:
wherein in a configuration in which a plurality of the light emitting transmission devices are disposed in parallel, and other transmission devices are subordinately connected to the transmission devices disposed in parallel through ports, providing an instruction for causing the light emitting transmission devices disposed in parallel to simultaneously emit light at different wavelengths.

8. The inter-transmission device connection registration method according to claim 6, further comprising:
searching whether connection information to an input port on an opposite side is already registered for an output port corresponding to an input port whose connection information is already registered in the storage unit in the additionally provided transmission device cascading connected to the light emitting transmission device; and
when the connection information of the output port of the additionally provided transmission device is not registered as a result of a search, performing a process of detecting a light reception at the input port on an opposite side of the output port that is not registered.

* * * * *